United States Patent
Quevillon

(10) Patent No.: US 8,157,988 B2
(45) Date of Patent: Apr. 17, 2012

(54) BALLAST FLOCCULATION AND SEDIMENTATION WATER TREATMENT SYSTEM WITH SIMPLIFIED SLUDGE RECIRCULATION, AND PROCESS THEREFOR

(75) Inventor: Luc Quevillon, Pierrefonds (CA)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 625 days.

(21) Appl. No.: 12/256,803

(22) Filed: Oct. 23, 2008

(65) Prior Publication Data

US 2010/0102006 A1   Apr. 29, 2010

(51) Int. Cl.
*C02F 1/52* (2006.01)

(52) U.S. Cl. ....... 210/96.1; 210/101; 210/113; 210/207; 210/206; 210/195.3

(58) Field of Classification Search ................ 210/96.1, 210/101, 113, 195.3, 207, 208
See application file for complete search history.

(56) References Cited

U.S. PATENT DOCUMENTS

| | | | |
|---|---|---|---|
| 4,267,052 A | | 5/1981 | Chang |
| 5,800,717 A | * | 9/1998 | Ramsay et al. ............... 210/711 |
| 6,824,692 B2 | * | 11/2004 | Binot et al. .................. 210/709 |
| 7,001,525 B2 | * | 2/2006 | Binot et al. .................. 210/709 |
| 7,083,715 B2 | * | 8/2006 | Binot ........................ 210/112 |
| 7,311,841 B2 | * | 12/2007 | Binot et al. .................. 210/666 |

FOREIGN PATENT DOCUMENTS

| | | |
|---|---|---|
| CA | 2 471 034 | 6/2004 |
| CA | 2 266 583 | 8/2006 |
| CA | 2643008 A1 | 8/2007 |
| CA | 2658909 A1 | 2/2008 |
| CA | 2672520 A1 | 7/2008 |
| FR | 2 801 878 A1 | 12/1999 |
| WO | WO 98/14258 | 4/1998 |
| WO | WO 98/32702 | 7/1998 |
| WO | WO 01/40121 A1 | 6/2001 |
| WO | WO 01/96246 A1 | 12/2001 |
| WO | WO 2006/097650 A1 | 9/2006 |
| WO | WO 2008/015143 A1 | 2/2008 |
| WO | WO 2008/083923 A1 | 7/2008 |

* cited by examiner

*Primary Examiner* — Tony G Soohoo
*Assistant Examiner* — Peter Keyworth
(74) *Attorney, Agent, or Firm* — Fraser Clemens Martin & Miller LLC; J. Douglas Miller

(57) ABSTRACT

A process for water treatment, including a combination of methods from the group comprising coagulation, sedimentation, flocculation and ballast flocculation, which is further improved by the addition of a simplified sludge recirculation system. The recirculation system corresponding to this process allows higher sludge density as well as less significant water volume losses by making the sludge accumulating at the bottom of the sedimentation zone go through a hydro cyclone a certain number of times in repeated cycles thus augmenting the solid particles density of the extracted sludge. The system may also be controlled by a suspended solid analyser, a flow meter and/or a timer. The present invention also includes a method of producing specific fluid flow control behavior with this simplified sludge recirculation system, which furthermore improves the efficiency of the process.

15 Claims, 7 Drawing Sheets

BALLAST FLOCCULATION AND SEDIMENTATION WATER TREATMENT SYSTEM WITH SIMPLIFIED SLUDGE RECIRCULATION, AND PROCESS THEREFOR

FIELD OF THE INVENTION

This invention relates to a simplified sludge recirculation system to be added to a system for potable, or industrial water or waste water treatment, which may include a combination of methods from the group comprising coagulation, sedimentation, flocculation and ballast flocculation, in order to improve its efficiency by reducing ballast and water loss. It also relates to a specific fluid flow behaviour rendered possible specifically due to the addition of the simplified sludge recirculation system, and which furthermore improves the efficiency of the process.

BACKGROUND OF THE INVENTION

Water treatment facilities are indispensable to the purification of potable, used and industrial water, wherein the water has been exposed to contaminants of various size and composition. The purification process is thus intended to remove those contaminants with the use of appropriately selected methods, which are generally relying on the containment of water in large tanks in order to apply the treatment. Some contaminants are dense enough to sink and accumulate at the bottom of those tanks, depending of the flow rate, while others are big enough to be successfully sieved from the water with a filter. However, some contaminants, called colloids, are microscopic particles evenly distributed inside a mixture that cannot be separated effectively from the hydrocolloid solution, which is the water and colloid mixture, by physical means and thus require specific treatment methods.

In order to separate the water from those unwanted pollutants, it must go through certain steps of purification. Pre-treatment can be made in order to retrieve large debris and adjust the pH of the water to facilitate ulterior steps of the treatment. To eliminate the smaller particles in suspension and thus clarify the water, water treatment facilities generally comprise a flocculation zone where a flocculating agent, either a polymer (like modified polyacrylamides), a chemical product (like sodium silicate) or in rare occasions a natural product with the same properties, is introduced within the water. With the addition of such a flocculating agent, flocs (particle aggregates) of contaminants start to form out of the colloids. A mixer with rotative blades generally stirs the mixture located inside the flocculation zone in order to maximise the contact between the flocculating agent and the contaminants, thus enabling the creation of bigger flocs.

This first step process, called flocculation, can be further improved with the addition of a ballasted material, like microsand, which acts as ballast and contact mass catalyzing the flocculation reaction inside the water and contaminants solution. When ballast is added, the aforementioned flocculating agent bonds it together with flocs of colloids and other particles, thus creating even bigger and heavier flocs by agglomerating previously created flocs along with sand particles. This in turn has the advantage of making the flocculation and the next step of the treatment happen faster.

The next step of the water treatment process is called sedimentation. It takes place in the sedimentation zone and capitalizes on the fact that gravity pulls every object toward the surface of the earth with a force proportional to its weight. Therefore, heavier particles are more easily dragged toward the bottom of this containment zone so the addition of granular ballast like sand, while not essential, can make a worthy addition to the process, reducing the time needed for the flocs to settle down at the bottom of the zone. The flocculation process is thus essentially a means of reducing the amount of colloids in suspension inside the liquid solution, creating relatively heavy flocs out of colloids which do not effectively sink to the bottom of the sedimentation zone with the influence of gravity as would the bigger particles in suspension inside the liquid solution. Purified water is subsequently collected when it overflows from the sedimentation zone. If ballast is used in the flocculation zone, ballasted flocs then accumulate at the bottom of the sedimentation zone and comprise both sand and particulate contaminants, further requiring to be treated to separate the sand from the pollutants.

The mixture comprising contaminants, colloïds, water and also sometimes sand form what is generally called "sludge", which is to be removed from the system after the extraction of as much of the sand and water as possible in order to maximize the efficiency of the process. The extracted sand can be used again and again in the process without the need to add much more throughout the course of action, depending on the effectiveness of the aforementioned extraction.

A non-essential additional step, called coagulation, can be added to the water treatment process in order to further improve its efficiency. If included in the process, it is generally the first step by which the polluted water begins its purification after pre-treatment. It consists in the addition of trivalent metallic salts to the water and contaminants solution. The salts (generally iron or aluminium composites) dissolve in water releasing ions with three positive charges which bind with colloids and then form small aggregates. Those aggregates are combined into flocs when a flocculating agent is added to the solution and because they are bigger particles than the colloids themselves, they make the agglomeration of aggregates into flocs relatively easier than the process without prior coagulation and thus augment the efficiency of the procedure at the cost of the inclusion of another zone to the facilities, the coagulation zone, and added expenses for the trivalent metallic salts.

The purified water is generally filtered after the sedimentation zone in order to remove unsettled flocs and particles which could still be in suspension inside the water. Water concentration of the sludge produced after sedimentation is still too high and thickening means are therefore needed to reduce it enough to facilitate transport, for example to landfill sites. This added process takes a lot of time to be efficient and often necessitates large amounts of space, as in the case of open air evaporation sites (or drying beds). An alternative is the method of pressing which requires the sludge to be pressed against textile filters to extract as much liquid as possible after what a compact residual cake is made out of the remaining solid contaminants. The method of centrifugation uses centrifugal force to extract water from the sludge, and as for pressing the residual contaminants are shaped in a compact cake. On the other hand, these methods require specialized machinery or vast open spaces to be efficient, which are costly and may be impractical depending of the economic and geographic situation of the community requiring them.

Another common problem of actual water treatment facilities is the extraction of sand ballast from the produced sludge which results in needless waste of material.

OBJECTS OF THE INVENTION

A first object of this invention is to reduce the volume of the sludge rejected by water treatment facilities which typically make use of a combination of water treatment methods comprising coagulation, flocculation, sedimentation and ballast flocculation, by providing an enhanced means of progressively purging water from said sludge through the use of an improved sludge recirculation system.

A second object of this invention is to present means to enhance water treatment processes which can be retro-fitted to existing facilities as well as newly constructed ones at minor costs.

A third object of this invention is to reduce the size of sludge water purging means in such facilities.

A fourth object of this invention is to eliminate the need for an exterior sludge water purging basin, used by some treatment facilities, thus reducing operating costs and duration of the water treatment process in such facilities.

A fifth object of this invention is to reduce the amount of ballast lost during water treatment processes which may include ballast flocculation.

SUMMARY OF THE INVENTION

The present invention represents a solution for already existing and future water treatment facilities necessitating means of reducing the amount of water contained inside the residual sludge retrieved after water treatment in order to reduce the volume of waste to be disposed subsequently. It also reduces the cost and size of the apparatus needed to further concentrate the sludge. The present invention also reduces the loss of ballast in concerned facilities with certain types of liquid and solid separation means by augmenting its recuperation rate, accomplished by multiple repeated cycles of sludge reinsertion in those means which is rendered possible by the present invention.

A water treatment process comprising coagulation, ballast flocculation and sedimentation typically allows sludge solid matter concentration between 0.05% and 0.1% (0.5 to 1.0 gram/litre). When combined to the simplified sludge recirculation system of this invention, extensive testing shows that the concentration proves to augment to above 30 g/L with rejected sludge volumes down by a percentage between 30 and 97 percents and necessitating smaller sludge thickening equipment.

The present invention also allows ballast recuperation with a rate equivalent to the one of water recuperation. The following table compares the performance results of the present invention with those of typical water treatment systems:

The combination of elements of embodiments one, two and three, as described latter on, makes possible the creation of a complex three-dimensional flow preventing the sludge from re-entering the topmost part of the sedimentation zone. This flow further improves the efficiency of the present invention and is a result of the particular designs described in the detailed description of the embodiments.

| Rise Rate/ Recirculation ratio | Matter in suspension (Raw water) | Typical Prior Art system performance | System performance according to the present invention | Performance gain |
| --- | --- | --- | --- | --- |
| 20 m/h and 3% recirculation | 20 mg/L | 96 m³/hour 0.6 g/L | 3.2 m³/hour 20 g/L | 97% |
| 40 m/h and 3% recirculation | 200 mg/L | 96 m³/hour 9.82 g/L | 47.1 m³/hour 20 g/L | 51% |
| 40 m/h | 600 mg/L | 192 m³/hour | 133.6 m³/hour | 30% |

-continued

| Rise Rate/ Recirculation ratio | Matter in suspension (Raw water) | Typical Prior Art system performance | System performance according to the present invention | Performance gain |
| --- | --- | --- | --- | --- |
| and 6% recirculation | | 13.9 g/L | 20 g/L | |
| 60 m/h and 6% recirculation | 200 mg/L | 192 m³/hour 13.9 g/L | 133.6 m³/hour 20 g/L | 30% |
| 80 m/h and 3% recirculation | 200 mg/L | 192 m³/hour 9.82 g/L | 94 m³/hour 20 g/L | 51% |

The invention consists of a sludge recirculation system to be added to a sedimentation zone of a water treatment facility using at least one purification method selected from the group consisting of flocculation, sedimentation, coagulation and ballast flocculation, said sludge recirculation system for repeated cycling of said sludge in a progressively water purging fashion, said system comprising:

a downstream sludge recovering vessel, including a sludge recovering cavity located at a bottom portion of said vessel, said cavity defining a certain volume of said sedimentation zone wherein sludge may accumulate therein under the influence of gravity;

a recirculation apparatus, comprising:
  i. liquid and solid separation means that allows the purification of a liquid solution by removing solid contaminants located therein;
  ii. recirculation means, comprising:
    1. a recirculation line connected at an intake end thereof to said sludge recovering cavity and connected to said liquid and solid separation means at an outlet end thereof;
    2. a reinsertion line operatively connected at an intake end thereof to said liquid and solid separation means and to said sludge recovering vessel at an outlet end thereof; and
    3. an elimination line connected at an intake end thereof to said reinsertion line and rejecting high density sludge outside of said water treatment facility at a downstream outlet end thereof;
  iii. means active during said repeated cycling of said sludge through the sludge recirculation system for progressively eliminating said sludge from said sludge recirculation system through said elimination line;
  iv. means to drive said sludge into said recirculation apparatus during said repeated cycling.

Preferably, said means to drive said sludge into said recirculation apparatus is a pump located downstream on said recirculation line. Also, said means for progressively eliminating said sludge from said sludge recirculation system includes means to monitor the solid constituents concentration of said sludge.

Preferably, said liquid and solid separation means is a hydro cyclone mounted downstream of said recirculation line relative to said pump, which comprises an overflow outlet and an underflow outlet, said overflow outlet connected to said recirculation means and said underflow outlet pouring inside a flocculation zone.

Preferably, a control means selected from the group comprising flow control means and solids concentration control means is further provided to regulate the speed of said liquid solution flowing through said recirculation apparatus in such a fashion as to optimize the efficiency of said hydro cyclone.

Preferably, said means for progressively eliminating said sludge from said sludge recirculation system through said elimination line is a suspended solid analyser which works in conjunction with said flow control device to further optimize the efficiency of said hydro cyclone by adjusting the flow speed to said solid constituents concentration of said sludge.

Preferably, the sedimentation zone comprises a rotating scraper, comprising a top part and a bottom part relative to the plane of said sedimentation zone and rotating in said plane, which guides said sludge deposited at said bottom of said sedimentation zone toward said sludge recovery cavity in such a fashion as to keep it grounded and effectively separates said sedimentation zone in a first upper section and a second lower section relative to the plane of the scraper, thus isolating said sludge recovery cavity, said recirculation line intake end and said reinsertion line outlet end located within said second lower part from said first upper part of said sedimentation zone.

Preferably, said rotating scraper is hollow-centered forming a hollow shaft and coincides with a downstream end portion of said reinsertion line of said recirculation apparatus pouring inside said sludge recovering cavity.

Preferably, an inverted cone is embossed on said bottom part of said scraper coaxially to said hollow shaft, substantially preventing said liquid solution located in said sludge recovering cavity from dynamically back flowing into said reinsertion line and maximising flow through said recirculation line.

Preferably, said recirculation apparatus extends externally to said sludge recovering vessel.

Preferably, said reinsertion line outlet of said recirculation apparatus opens inside of said sludge recovering cavity.

Preferably, a sand sedimentation chamber is further included in said recirculation apparatus and mounted upstream of said reinsertion line and of said elimination line and downstream of said hydro cyclone, enabling sand-like granular material recuperation within said recirculation apparatus where the sludge contains sand-like material.

Preferably, said recirculation apparatus comprises a hydro cyclone, a recirculation flow control valve mounted to said reinsertion line and a suspended solid analyser also mounted to said reinsertion line, controlling the opening and closing of said flow control valve depending on concentration of said sludge inside said recirculation apparatus.

Preferably, a suspended solid analyser is installed at an entry pipe feeding said water treatment facility with water, thus allowing the water flow through said recirculation apparatus to be controlled depending on the colloidal contaminants concentration inside the water.

Preferably, said hydro cyclone wherein said hydro cyclone rejects recirculated sludge in the sludge recirculation system.

The invention also consists of a method of creating a particular fluid flow behaviour making use of said sludge recirculation, preventing the sludge located in said second lower section of said sedimentation zone of coming back in said first upper section of the sedimentation zone as well as maximizing the flow from said reinsertion line to said recirculation line, comprising the following steps:
a) a mixture of water and contaminants flocs enters a sedimentation zone;
b) the flocs then drop to a downstream sludge recovering vessel, including a sludge recovering cavity, located at a bottom portion of said vessel, said cavity defining a certain volume of said sedimentation zone under the influence of gravity, forming sludge;
c) a rotating scraper, comprising a bottom end and a hollow center, guides said sludge deposited at said bottom of said vessel toward said sludge recovery cavity in such a fashion as to keep it grounded;
d) a recirculation line having an intake mouth thereof located inside said sludge recovering cavity and operatively connected to a pump, drives sludge into said recirculation apparatus;
e) a certain amount of sludge is reinserted within said sludge recovering cavity through a reinsertion line having an outlet end thereof located inside said hollow-center of said scraper;
f) the resulting stream of sludge flows back toward said recirculation line without back flowing inside the reinsertion line due to the specific combination of:
  i. said rotating scraper;
  ii. said sludge recovering cavity;
  iii. said recirculation apparatus;
  iv. said recirculation line; and
  v. said reinsertion line of said recirculation apparatus located inside said hollow center of said rotating scraper and pouring into said sludge recovering cavity.

Preferably, an inverted cone is added to said bottom end of said scraper, further enabling the flow of said sludge pouring from said reinsertion line through said recirculation line without backflowing inside said reinsertion line.

The invention also consists of a method of creating a particular fluid flow behaviour that prevents the sludge located in said second lower section of said sedimentation zone of coming back in said first upper section of the sedimentation zone as well as maximizes the flow from said reinsertion line to said recirculation line, comprising the following steps:
a) a mixture of water and contaminants flocs enters a sedimentation zone;
b) the flocs then drop to a downstream sludge recovering vessel, including a sludge recovering cavity, located at a bottom portion of said vessel, said cavity defining a certain volume of said sedimentation zone under the influence of gravity, forming sludge;
c) a rotating scraper, comprising a bottom end and a hollow center, guides said sludge deposited at said bottom of said vessel toward said sludge recovery cavity in such a fashion as to keep it grounded;
d) a recirculation line having an intake mouth thereof located inside said sludge recovering cavity and operatively connected to a pump, drives sludge into said recirculation apparatus;
e) a certain amount of sludge is reinserted within said sludge recovering cavity through a reinsertion line having an outlet end thereof located inside said hollow-center of said scraper;
f) the resulting stream of sludge flows back toward said recirculation line without back flowing inside the reinsertion line due to the specific combination of:
  i. said rotating scraper;
  ii. said sludge recovering cavity;
  iii. said recirculation apparatus
  iv. said recirculation line; and
  v. said reinsertion line of said recirculation apparatus located on the wall of said sludge recovering cavity.

Preferably, an inverted cone is added to said bottom end of said scraper, further enabling the flow of said sludge pouring from said reinsertion line through said recirculation line without backflowing inside said reinsertion line.

The invention also consists of a method of creating a particular fluid flow behaviour that prevents the sludge located in said second lower section of said sedimentation zone of coming back in said first upper section of the sedimentation zone as well as maximizes the flow from said reinsertion line to said recirculation line, comprising the following steps:
   a. a mixture of water and contaminants flocs enters a sedimentation zone;
   b. the flocs then drop to a downstream sludge recovering vessel, including a sludge recovering cavity, located at a bottom portion of said vessel, said cavity defining a certain volume of said sedimentation zone under the influence of gravity, forming sludge;
   c. a recirculation line having an intake mouth thereof located inside said sludge recovering cavity and operatively connected to a pump, drives sludge into said recirculation apparatus;
   d. a certain amount of sludge is reinserted within said sludge recovering cavity through a reinsertion line having an outlet end thereof located on the wall of said sludge recovering cavity;
   e. the resulting stream of sludge flows back toward said recirculation line without back flowing inside the reinsertion line due to the specific combination of:
      i. said sludge recovering cavity;
      ii. said recirculation apparatus;
      iii. said recirculation line; and
      iv. said reinsertion line of said recirculation apparatus located on the wall of said sludge recovering cavity.

BRIEF DESCRIPTION OF THE DRAWINGS

In the drawings illustrating the preferred embodiment of the invention.

DETAILED DESCRIPTION OF THE EMBODIMENTS

Figure 1:
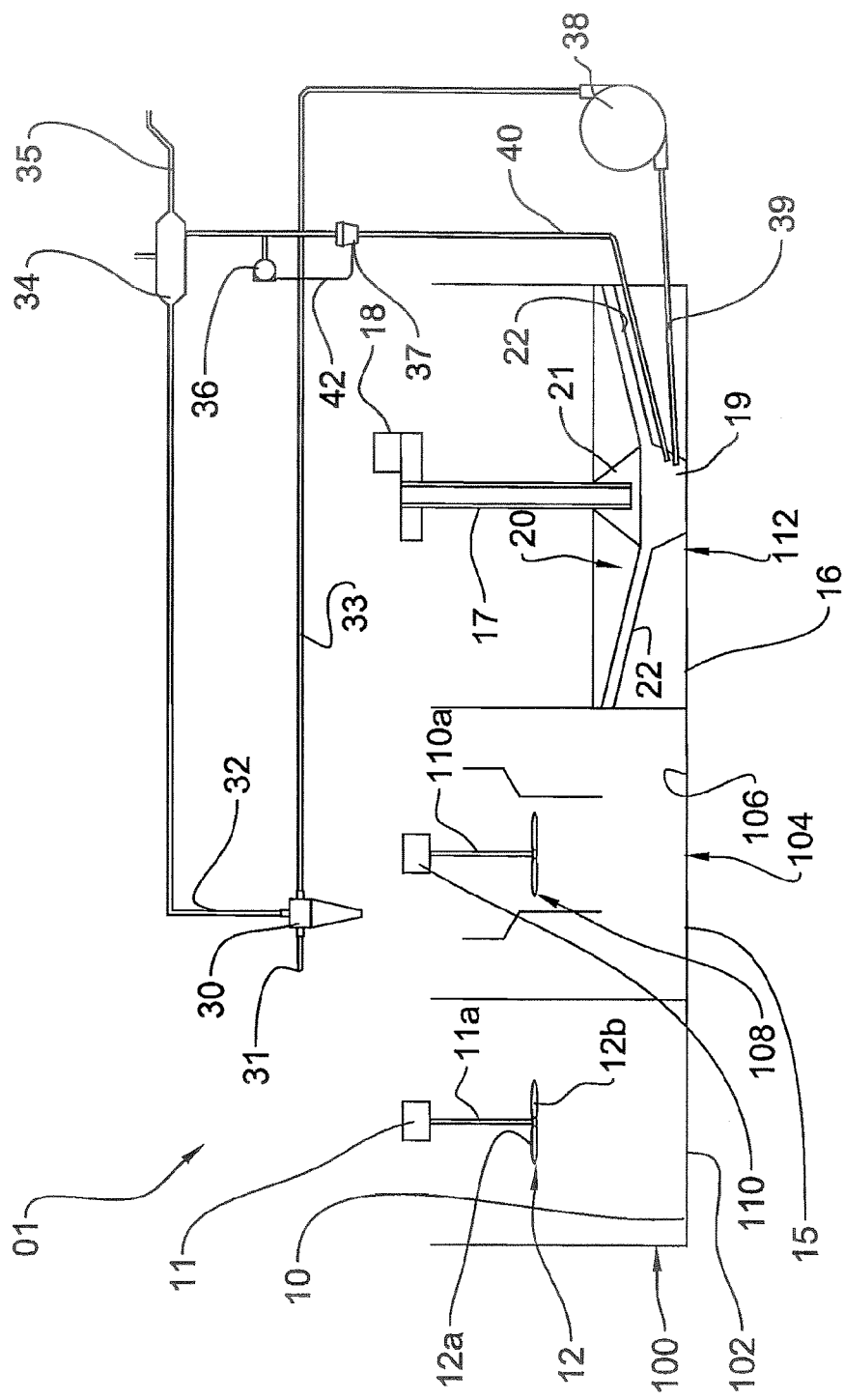
FIG. 1 is a schematic elevational view of a water treatment facility with the present invention relying on an exterior sludge recirculation system, further known as embodiment one.

FIG. 1 generally shows a water treatment facility 01 comprising 3 main zones inside which water is circulating with an added sludge recirculation system corresponding to embodiment one of the present invention. Water flows from left to right, in order to be progressively purified from its contaminants. The upstream coagulation zone 10 is defined as an upright containment vessel 100 for example of cubic shape receiving water through a conduit that may be a conventional pipe and which is not shown on the figure. A coagulant, preferably a trivalent metallic salt is added to the water flowing in coagulation zone 10 in order to initiate the formation of aggregates of contaminants amidst the water. The small pollutant particles in suspension within this water are generally negatively charged and thus are attracted by the trivalent metallic salts, which dissolve in the water leaving ions with three positive charges. A motor 11 fixed above the coagulation zone allows the rotation of the mixer 12, to which it is connected by the rotary shaft 11a. Mixer 12 includes a number of rotatable blades 12a, 12b, . . . extending generally horizontally in operative condition, spacedly over the flooring 102 of the first upstream containment vessel 100.

The shaft 11a is long enough for the mixer 12 to rest at a certain depth below water surface inside the coagulation zone 10 and rotates along with the mixer 12 because of the rotary motion transmitted by the motor 11. The mixer blades 12a, 12b, . . . rotate in a plane generally parallel to the plane of vessel flooring 102 and stirs the water and trivalent metallic salts solution in order to maximize the contact surface between the two reactants and thus the ionic attraction between said ions with positive charges and the contaminants within the water. This step is not compulsory to the achievement of proper water purification but may improve the efficiency of the water treatment.

The water, now containing small aggregates of contaminants, is then poured inside a second upright containment vessel 104, which is called the flocculation zone 15. A motor 110 fixed above the flooring 106 of vessel 104 also allows a second mixer 108 to rotate at a certain depth below the water surface spacedly over the plane of the flooring 106 of vessel 104 by the inclusion of the rotary shaft 110a. A flocculating agent is mixed to the water in vessel 104, which is already containing aggregates formed in the coagulation zone.

This flocculating agent is mixed thoroughly inside the water by mixer 108 and allows the formation of flocs of particles inside the flocculation zone 15 when combining with contaminants. The formation rate and size (and thus the weight) of the flocs can preferably be further augmented by the addition of ballast. The most commonly used ballast is micro-sand (for example between 50 μm and 150 μm in diameter), due to its general availability and relatively cheap cost.

The water then enters a third zone called the sedimentation zone 16 located in another upright containment vessel 112. The flocs and aggregates that were created inside the two preceding zones 10 and 15 are attracted by gravity toward the funnel-shaped flooring 22 of downstream vessel 112. Heavier particles are therefore more likely to sink to the flooring 22 of the sedimentation zone 16 and do so more quickly than lighter ones, which is the interest of coagulation and ballast flocculation in order to improve the efficiency of the water treatment system. A scraper 20, which may carry a device such as an inverted cone 21 at its center, is given a rotational movement along the plane of the sedimentation zone 16 through a motor 18 driving a rotatable upright shaft 17.

The purpose of shaft 17 is to rake the flocs of contaminants which have deposited on the radially inwardly downwardly sloped walls of flooring 22 of a sludge recovering cavity 19 located beneath inverted cone 21 in the center of the sedimentation zone 16. The flocs of contaminants thus gather inside the sludge recovering cavity 19, the mass of which consequently forming sludge.

The inverted cone 21 may be replaced by other suitable structures, for example by a horizontal perforated plate, spacedly supported over pit flooring 22. The perforations of such a perforated plate would enable free passage of the sludge at such a flow rate that the sludge would not be returned to a state of suspension.

This sludge, which contains a relatively large volume of water, shall hereinafter be called diluted sludge. To optimize the operation of this water treatment, this diluted sludge needs to be treated in order to purge as much water as possible from the diluted sludge. To achieve this goal, the diluted sludge is sucked into the recirculation intake line 39 of the recirculation apparatus by the action of the pump 38. The sludge then goes through outlet line 33 and enters a hydro cyclone 30, which conventionally serves as a liquid and solid separation means. The hydro cyclone 30 is made in such a way that sludge with a higher concentration of contaminants needs a slower flow rate through the hydro cyclone 30 to achieve high separation rates, and inversely sludge with a lower concentration of contaminants requires faster flow rates to achieve good separation rates, due to its centrifugal functioning.

The overflow material, containing the lower density particles, exits the hydro cyclone 30 through outlet pipe 32 and the underflow material, containing the higher density particles, goes through the bottom opening to be reused. The service water input 31 enables cleansing of recirculated ballasted material. A sand sedimentation air vent chamber 34 may be connected to pipe 32 as it allows better recuperation of the sand still found inside the overflow provided by the hydro cyclone 30. Also, we have found after several testings that the and sedimentation chamber is a good place to add an air vent. This air vent facilitates separation of air from recirculated sludge, and thus prevents air from being introduced at the sludge recirculation pit. The resulting sludge is then either sent through the elimination outlet line 35 of the recirculation apparatus out of the water treatment facility, or the sludge goes back to the sludge recovering cavity 19 by reinsertion line 40. A device 36 controlling the opening of flow control valve 37 selects lines 35 or 40, if the concentration of solid contaminants inside the sludge reaches a predetermined level or if the flow rate reaches a specified value or after a certain amount of time. Device 36 may consist for example of a suspended solid analyser, a flow meter or a timer, respectively. The higher contaminants concentration sludge thereafter reinserted inside the sludge recovering cavity 19 mixes with diluted sludge resulting from the sedimentation of the flocs in the sedimentation zone 16 and the cycle starts over again, gradually increasing the solid constituents concentration of the sludge being progressively purged of water.

Figure 7:
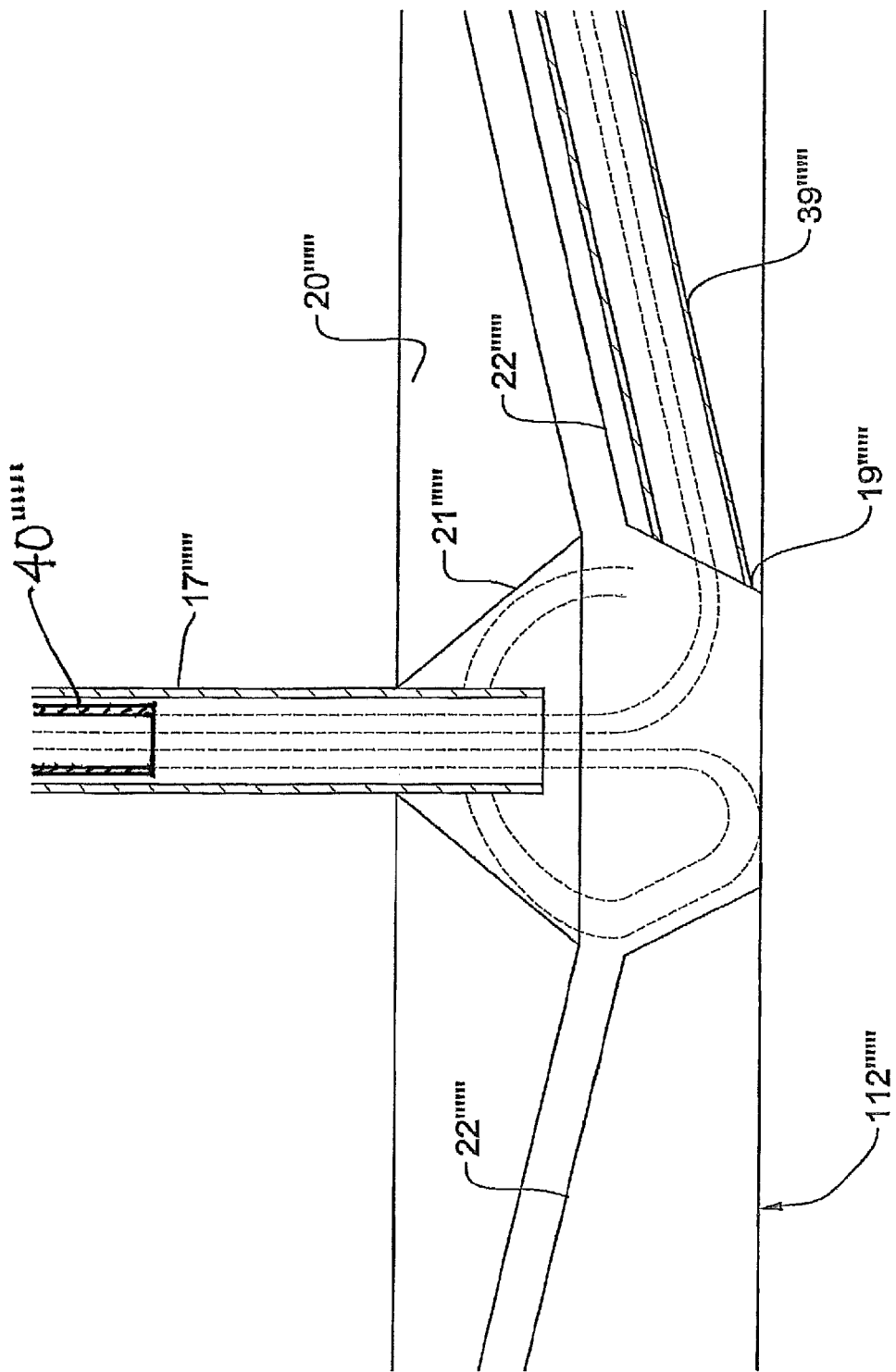
FIG. 7 shows a graphic representation at an enlarged scale relative to FIGS. 2 to 4, 5 and 6, of the simulation of the specific flow dynamic of the sludge going through the sludge recirculation system of the present invention, in this case the sludge recirculation system of embodiment two, and taken at the bottom right hand side portion of FIG. 2-4, 5 or 6.

Also, the combination of the scraper 20'''', the upwardly pointed embossed cone 21'''', the sludge recovering cavity and both the recirculation line 39'''' and reinsertion in the central tube line 40'''' create a particular fluid flow behaviour inside the sludge recovering cavity 19'''' as seen on FIG. 7. This flowing behaviour guides the sludge from the reinsertion line 40'''' to the recirculation line 39'''' while also incorporating to the concentrated sludge coming from the reinsertion line 40'''' the diluted sludge which accumulates inside sludge recovering cavity 19'''' due to sedimentation.

Figure 2:
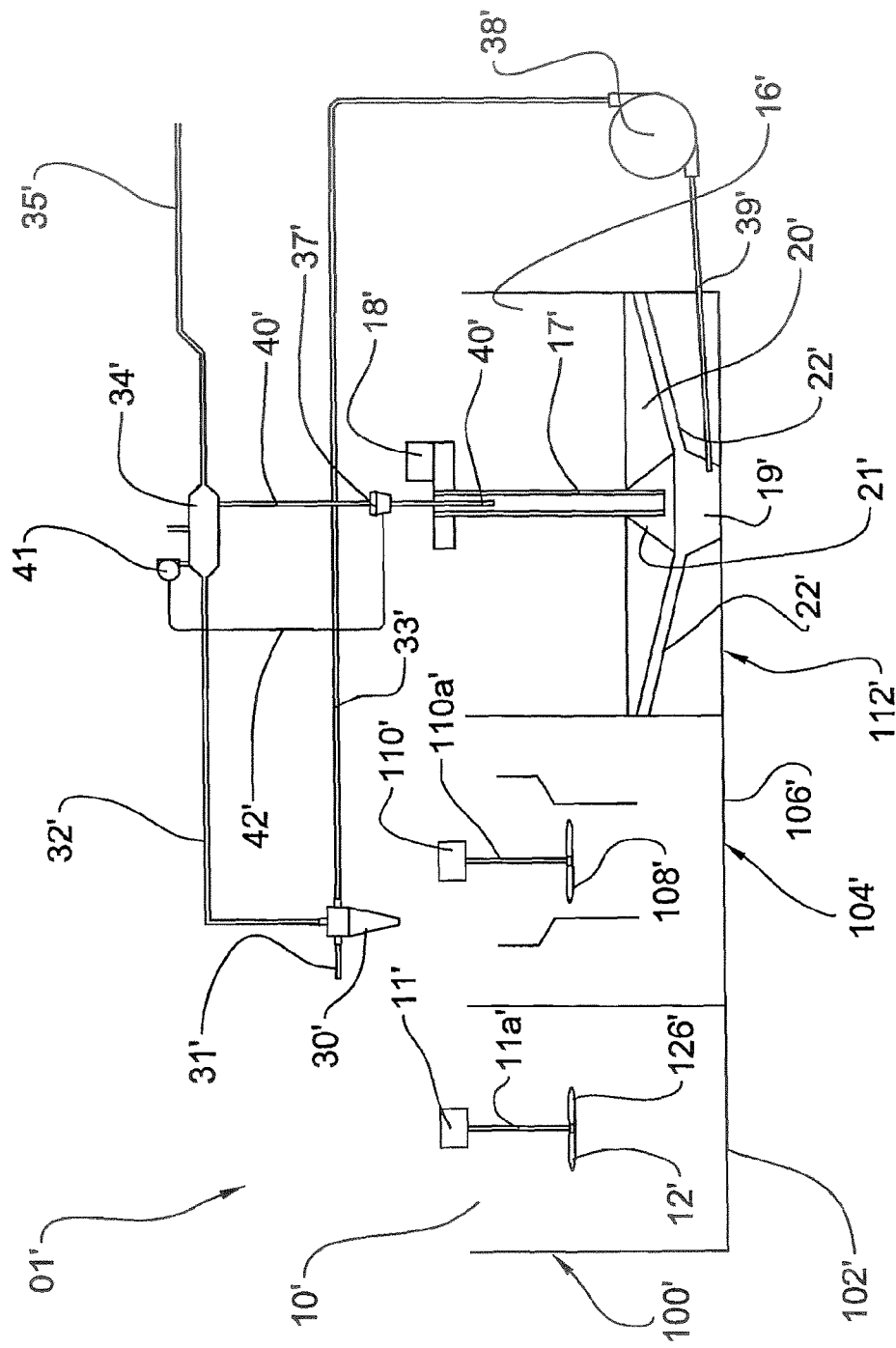
FIG. 2 is a schematic elevational view of a water treatment facility where a sludge recirculation system reinserts the sludge at the bottom of the sedimentation zone with a conduit going down through the hollow center of the rotating scraper, further known as embodiment two, and where the sludge recirculation flow is regulated by a suspended solid analyzer.
Figure 3:
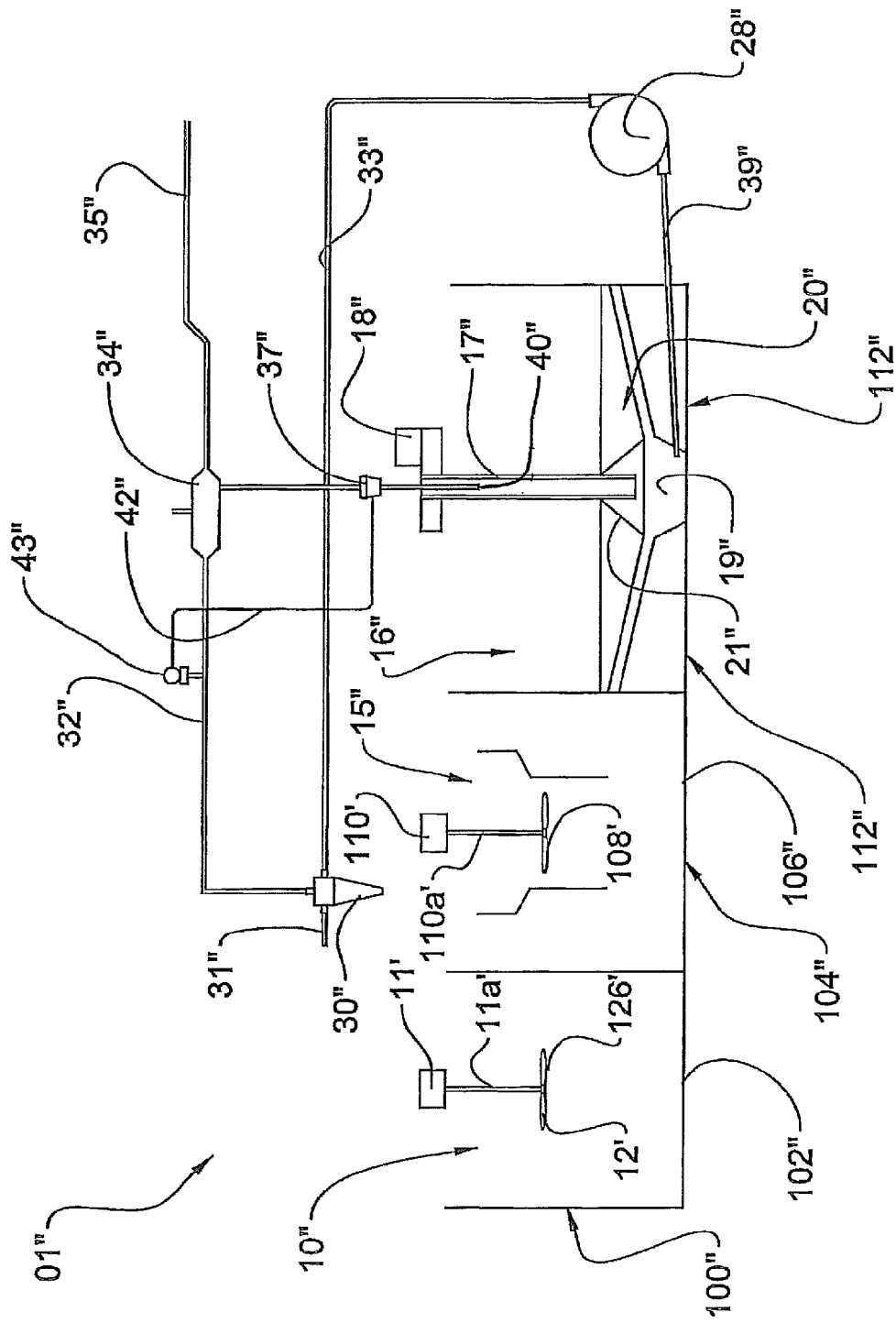
FIG. 3 is another schematic elevational view of a water treatment facility comprising the second embodiment of the sludge recirculation system of FIG. 2 where the sludge recirculation flow is instead regulated by a flowmeter.
Figure 4:
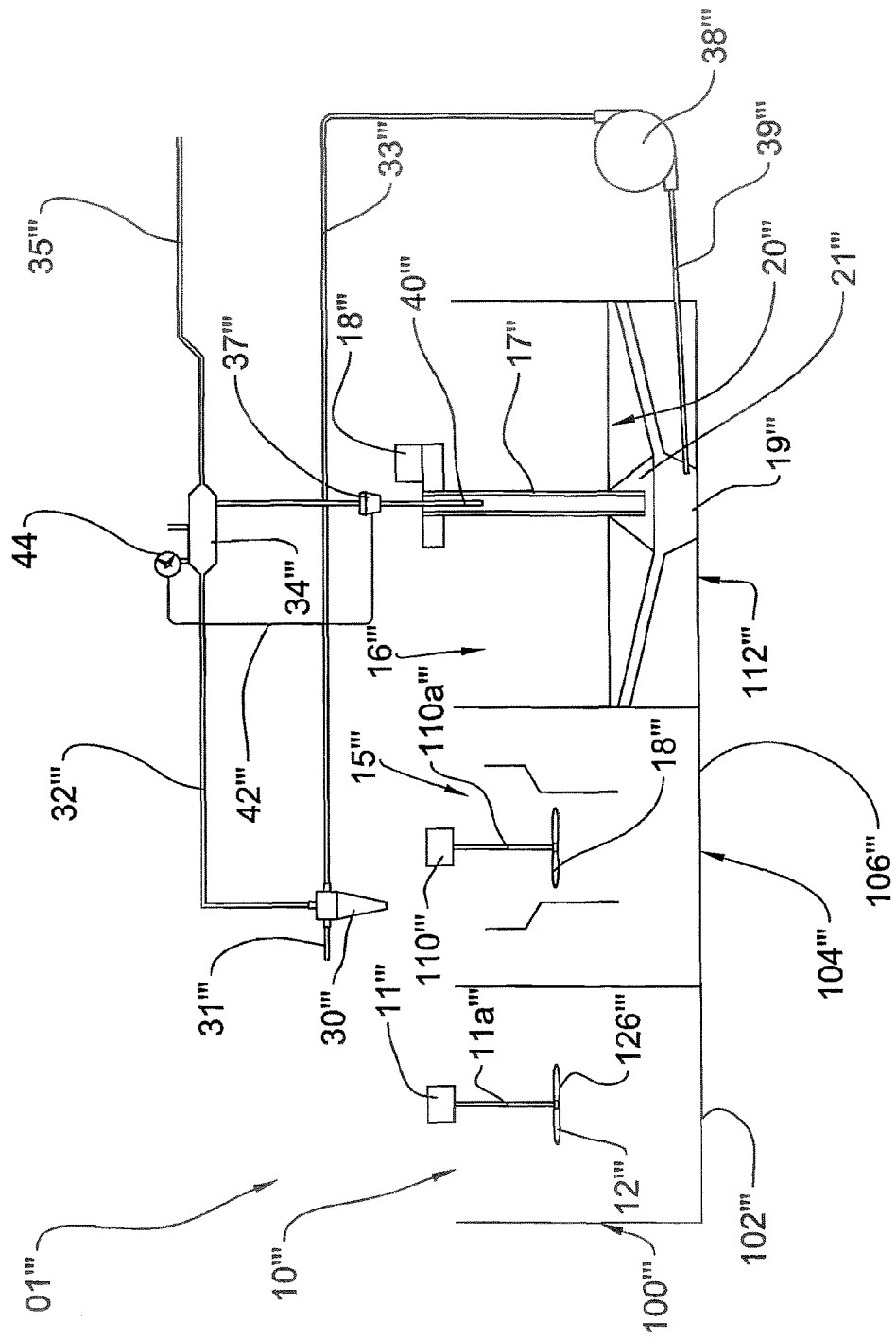
FIG. 4 is another schematic elevational view of a water treatment facility where the sludge recirculation flow is controlled by a timer.

Once again, the combination of the scraper 20', 20'', 20''' the inverted cone 21', 21'', 21''' the sludge recovering cavity and both the recirculation line 39', 39'', 39''' and reinsertion line 40', 40'', 40''' located inside the rotating shaft 17', 17'', 17''' on FIGS. 2, 3 and 4, respectively creates a particular fluid flow behaviour inside the sludge recovering cavity 19', 19'', 19'''. This flowing behaviour guides the sludge from the reinsertion line 40', 40'', 40''' to the recirculation line 39', 39'', 39''' while also incorporating to the concentrated sludge coming from the reinsertion line 40', 40'', 40''' the diluted sludge which accumulates inside sludge recovering cavity 19', 19'', 19''' due to sedimentation. In this case, however, the inverted cone 21', 21'', 21''' is much preferred as it prevents concentrated sludge coming from the reinsertion line 40', 40'', 40''' from back flowing.

This particular fluid flow behaviour has been simulated using state of the art computer programs following known principles of fluid mechanics and the result is thus shown on FIG. 7. It shows the concentrated sludge downwardly pouring from the reinsertion line 40'''' into the sludge recovering cavity 19'''' and either going straight to the recirculation line 39'''' or being redirected by the inverted cone 21'''' in order to keep this sludge in the cavity 19'''' of the sedimentation zone 16''''. This fluid flow behaviour thus maximizes recirculation of the concentrated sludge, while mixing it with diluted sludge continually depositing due to gravity, through the recirculation apparatus with the inverted cone 21'''' substantially controlling backflow of the concentrated sludge toward the top part of the sedimentation zone 16'''', thus effectively separating the sludge recovering cavity from the top part of the sedimentation zone 16''''.

FIGS. 2, 3 and 4 essentially show the water treatment facility of FIG. 1 but with embodiment two of the present invention and different means of controlling the flow throughout the recirculation apparatus. In those embodiments, the rotating shaft 17' of the sedimentation zone 16', which rotates the scraper 20', has a hollow center, allowing the outlet end mouth of reinsertion line 40' from embodiment one to be located inside thereof. This configuration allows for a better integration of the sludge recirculation system of the present invention inside the water treatment facility, necessitating less space to operate.

On FIG. 2, a suspended solid analyser 41 is installed on line 42' connecting the sand sedimentation chamber 34' and the flow control valve 37', allowing the selective opening of the latter depending on the concentration of solid constituents of the sludge inside the sand sedimentation chamber 34'. If this concentration is below a predetermined threshold value, then the suspended solid analyser 41 controls the flow control valve 37' by sending a signal through a communicating means 42', which is in this case a cable. The sludge is then reinserted inside the sludge recovering cavity 19' so it can mix with the diluted sludge that gradually accumulates due to sedimentation. When the concentration exceeds said threshold value, the flow control valve 37' closes and the highly concentrated sludge can exit the sludge recirculation system through the elimination line 35'.

On FIG. 3, a flow meter 43'' is installed at the same position as the suspended solid analyser 41 of FIG. 2 which it replaces. In this case, the flow meter 43'' also dictates to the flow control valve 37'' whether it should be opened or closed, depending on the predetermined threshold values of flow rates.

On FIG. 4 a timer 44 can replace the suspended solid analyser 41 of FIG. 2. In this case, the timer 44 is used to punctually operate the flow control valve 37''', depending on the predetermined time value inputted.

Figure 5:
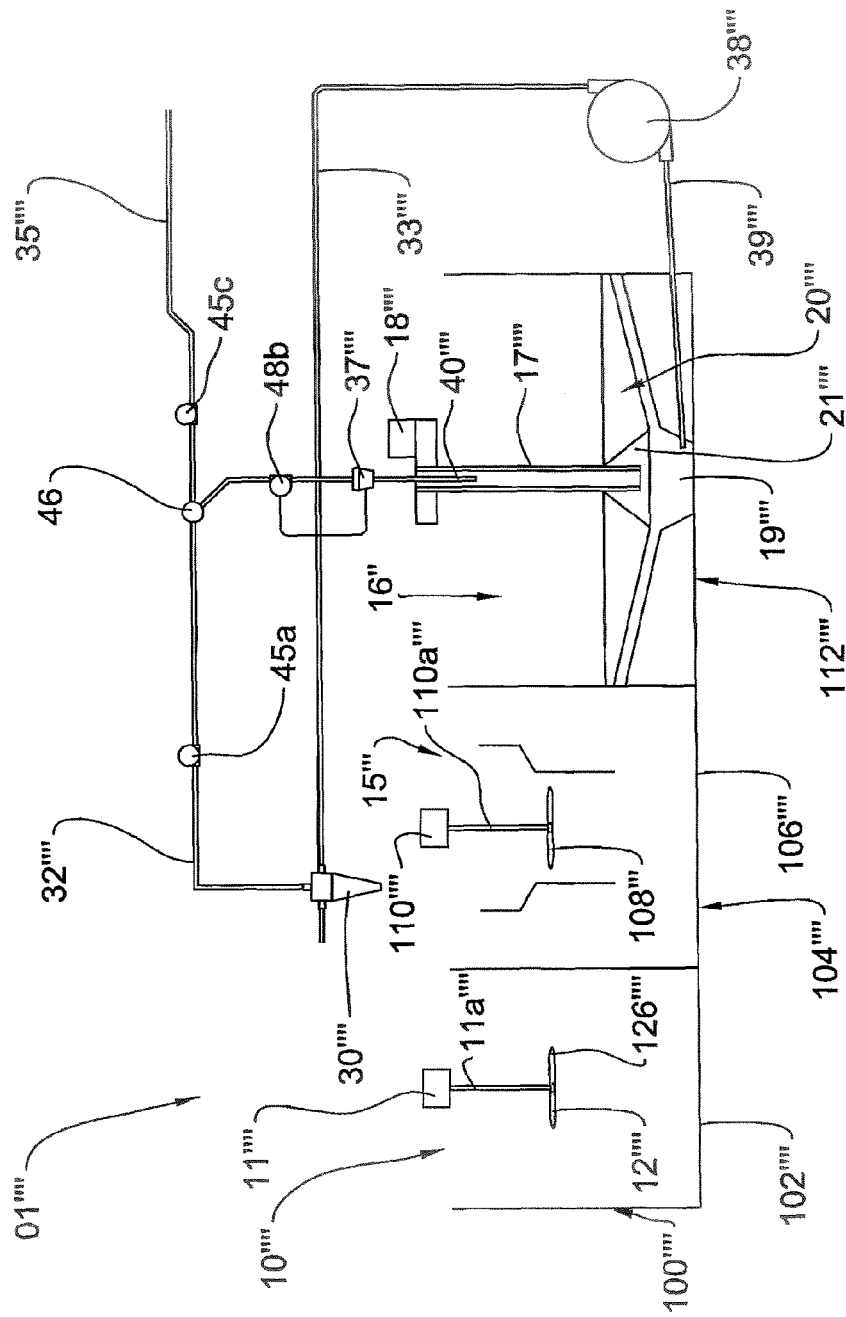
FIG. 5 is another schematic elevational view of a water treatment facility showing the different emplacements wherein recirculation flow control or suspended solid analysis components may be located.

FIG. 5 shows the preferred positions for the flow control devices of FIGS. 2 and 3, respectively a suspended solid analyser 41 or a flow meter 43''. In this case, the superfluous sand sedimentation chamber 34'''' has been omitted for clarity of the view. The devices are still used to manage the flow control valve 37'''', while the different positions shown each have their particular advantages depending on the intended use of the sludge recirculation system. The flow control device position 45a is connected to the overflow outlet line 32"" of the hydro cyclone 30"" and located downstream of the junction 46"" between reinsertion line 40"" and elimination line 35"". At position 45a, the flow control device effectively changes the configuration of the flow control valve 37"" before the desired concentration crosses the y-junction 46"". This position 45a allows the sludge recirculation system to reinsert only sludge with lower concentrations than the threshold value inside the sludge recovering cavity 19"", which in turn allows for a certain time saving.

Actually, if the flow control device is located at position 45b, only sludge with a concentration equal to or above the threshold value will be eliminated from the system, thus assuring a minimum efficiency. However, sludge with a concentration high enough to be eliminated through the elimination line 35"" will be reinserted inside the sludge recovering cavity 19"" because of its position upstream of the y-junction 46"" thus requiring unneeded recirculation of the sludge and in turn more time to treat it. A combination of the two systems 45a and 45b of flow control devices, however, allows for the qualities of both to be used to maximize the efficiency of the system. A flow control device located at position 45c could further be used in combination with either a flow control device at position 45a or 45b or both 45a and 45b in order to stop the output of concentrated sludge in the event of a breakdown or failure of the system that could send diluted sludge accidentally toward the elimination line 35"" even though it doesn't meet the concentration requirements of the predetermined threshold value.

Figure 6:
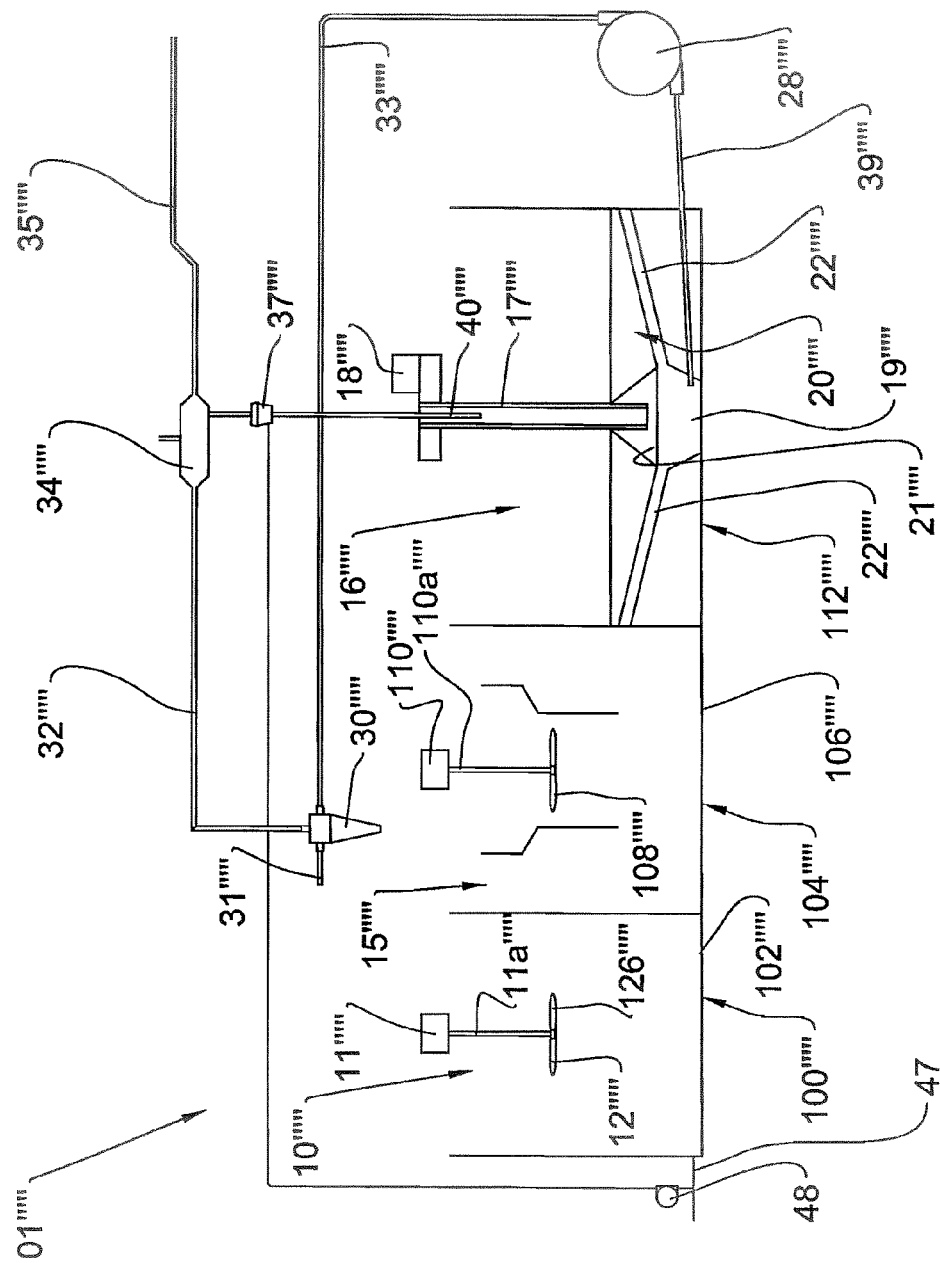
FIG. 6 shows another schematic elevational view of a water treatment facility where the recirculation flow control is done by suspended solid analysis of the water flowing through the feeding pipe.

The water treatment facility of FIG. 6 comprises a suspended solid analyser 48 mounted on the input line 47 which brings water to the coagulation zone 10"" which manages the flow control valve 37"" of the sludge recirculation system in such a manner that the concentration of the sludge coming out of the sludge recirculation system through the elimination line 40"" is concentrated enough based on the water input concentration. This system can be used in combination with those of the preceding figures in order to further optimize the efficiency of treatment of the extracted sludge.

The invention claimed is:

1. A sludge recirculation system to be added to a sedimentation zone of a water treatment facility using at least one purification method selected from the group consisting of flocculation, sedimentation, coagulation and ballast flocculation, said sludge recirculation system for repeated cycling of sludge in a progressively water purging fashion, said system comprising:
   a downstream sludge recovering vessel, including a sludge recovering cavity located at a bottom portion of said vessel, said cavity defining a certain volume of a sedimentation zone wherein said sludge may accumulate therein under the influence of gravity;
   a recirculation apparatus, comprising:
     i. liquid and solid separation means that allows the purification of a liquid solution by separating said sludge including low density solids from high density solids;
     ii. recirculation means, comprising:
       1. a recirculation line connected at an intake end thereof to said sludge recovering cavity and connected to said liquid and solid separation means at an outlet end thereof;
       2. a reinsertion line operatively connected at an intake end thereof to said liquid and solid separation means and to said sludge recovering vessel at an outlet end thereof, said reinsertion line allowing said sludge including said low density solids to be reinserted into said vessel; and
       3. an elimination line connected at an intake end thereof to said reinsertion line and rejecting said sludge including said low density solids outside of said water treatment facility at a downstream outlet end thereof;
     iii. means active during said repeated cycling of said sludge through the sludge recirculation system for progressively eliminating said sludge including said low density solids from said sludge recirculation system through said elimination line; and
     iv. means to drive said sludge into said recirculation apparatus during said repeated cycling.

2. A sludge recirculation system as in claim 1, wherein said means to drive said sludge into said recirculation apparatus is a pump located downstream on said recirculation line.

3. A sludge recirculation system as in claim 2, wherein said liquid and solid separation means is a hydro cyclone mounted downstream of said recirculation line relative to said pump, which comprises an overflow outlet and an underflow outlet, said overflow outlet connected to said recirculation means and said underflow outlet pouring inside a flocculation zone.

4. A sludge recirculation system as in claim 3, wherein a control means selected from the group consisting of flow control means and solids concentration control means is further provided to regulate a flow of said liquid solution flowing through said recirculation apparatus in such a fashion as to optimize the efficiency of said hydro cyclone.

5. The sludge recirculation system of claim 4, wherein said means for progressively eliminating said sludge including said low density solids from said sludge recirculation system through said elimination line is a suspended solid analyser which works in conjunction with said flow control means to further optimize the efficiency of said hydro cyclone by adjusting the flow to a solids concentration of said sludge including said low density solids.

6. A sludge recirculation system as in claim 5, wherein said sedimentation zone comprises a rotating scraper, comprising a top part and a bottom part relative to the plane of said sedimentation zone and rotating in said plane, which guides said sludge deposited at said bottom of said sedimentation zone toward said sludge recovery cavity in such a fashion as to keep it grounded and effectively separates said sedimentation zone in a first upper section and a second lower section relative to the plane of the scraper, thus isolating said sludge recovery cavity, said recirculation line intake end and said reinsertion line outlet end located within said second lower part from said first upper part of said sedimentation zone.

7. A sludge recirculation system as in claim 6, wherein said rotating scraper is hollow-centered forming a hollow shaft and coincides with a downstream end portion of said reinsertion line of said recirculation apparatus pouring inside said sludge recovering cavity.

8. A sludge recirculation system as in claim 7, wherein an inverted cone is embossed on said bottom part of said scraper coaxially to said hollow shaft, substantially preventing said liquid solution located in said sludge recovering cavity from dynamically back flowing into said reinsertion line and maximising flow through said recirculation line.

9. A sludge recirculation system as in claim 6, wherein said recirculation apparatus extends externally to said sludge recovering vessel.

10. A sludge recirculation system as in claim 5, wherein said reinsertion line outlet of said recirculation apparatus opens inside of said sludge recovering cavity.

11. A sludge recirculation system as in claim 7, wherein a sand sedimentation chamber is further included in said recirculation apparatus and mounted upstream of said reinsertion line and of said elimination line and downstream of said hydro cyclone, enabling sand-like granular material recuperation within said recirculation apparatus where the sludge contains sand-like material.

12. A sludge recirculation system as in claim 7, wherein said recirculation apparatus comprises a hydro cyclone, a recirculation flow control valve mounted to said reinsertion line and a suspended solid analyser also mounted to said reinsertion line, controlling the opening and closing of said flow control valve depending on concentration of said sludge inside said recirculation apparatus.

13. A sludge recirculation system as in claim 1, wherein a suspended solid analyser is installed at an entry pipe feeding said water treatment facility with water, thus allowing the flow through said recirculation apparatus to be controlled depending on colloidal contaminants concentration inside the water.

14. A sludge recirculation system as in claim 7, wherein said hydro cyclone rejects recirculated sludge in the sludge recirculation system.

15. A sludge recirculation system as in claim 1, wherein said means for progressively eliminating said sludge including said low density solids from said sludge recirculation system includes means to monitor a solid constituents concentration of said sludge.

* * * * *